Figure 1:
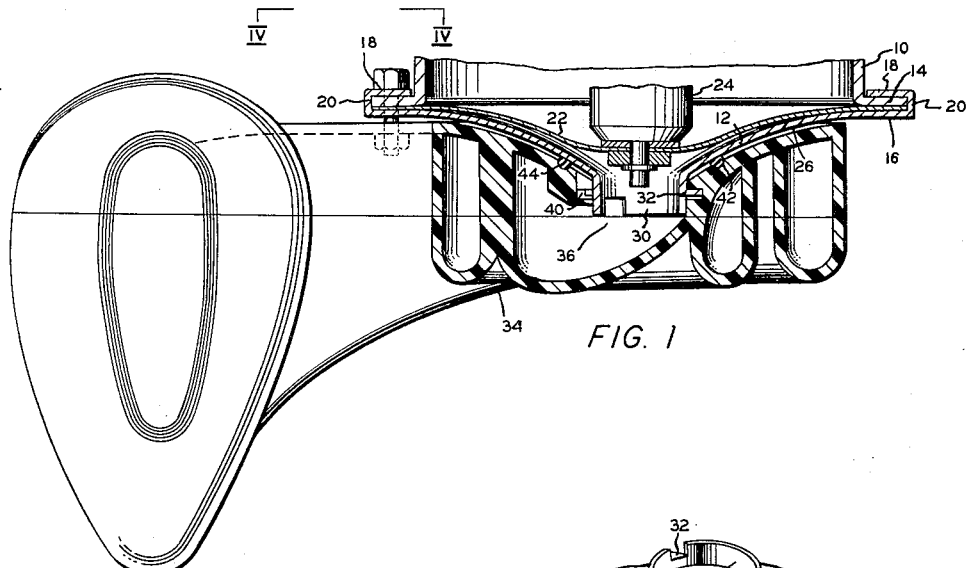

May 21, 1963     WEICHIEN CHOW ETAL     3,090,349

HORN CONSTRUCTION

Filed Aug. 11, 1960

INVENTORS
WEICHIEN CHOW
WILLIAM H. FISHER

BY Beaman & Beaman
ATTORNEY

United States Patent Office 3,090,349
Patented May 21, 1963

3,090,349
HORN CONSTRUCTION
Weichien Chow, Jackson, and William H. Fisher, Vandercock Lake, Mich., assignors to Sparton Corporation, Jackson, Mich., a corporation of Ohio
Filed Aug. 11, 1960, Ser. No. 49,033
8 Claims. (Cl. 116—142)

The invention pertains to a horn construction and particularly relates to an electric automotive type horn employing a vibrator motor, diaphragm and a projector. The present invention is a continuation-in-part of U.S. application No. 574,717 filed March 29, 1956 now U.S. Patent No. 2,958,307.

As set forth in the above patent, the use of lightweight, nonmetallic horn projectors have definite advantages over many types of conventional constructions both from the manufacturing and functional aspects. The present invention is directed to an arrangement wherein the horn motor and diaphragm housing are assembled as a unit and the projector, preferably formed of a synthetic plastic material, is detachably mounted to the motor housing unit.

It is, therefore, a purpose of the invention to provide a horn construction employing a motor housing unit and projector wherein the projector is detachably mounted to the housing unit in such a manner that the vibration and resonance of the projector may be semi-independent of the frequency of vibration of the rigid housing unit whereby a superior acoustic result is produced.

Another object of the invention is to provide a horn construction employing a motor housing unit and a detachably mounted scroll projector wherein the projector may be selectively angularly positioned relative to the housing unit to provide optimum mounting and sound directional characteristics.

A further object of the invention is to provide a horn construction employing a detachable scroll projector wherein the projector may be easily attached to the motor housing permitting assembly of the projector to the motor housing after assembly and painting of the housing and which prevents projector interference during the housing assembly whereby the separate engaging portions of the motor housing may be uniformly assembled to provide an effective hermetic seal. An important economic advantage lies in the use of a detachably mounted projector in that upon the necessity for scrapping the motor and diaphragm unit due to defective assembly or malfunctioning, the projector may be removed from the assembled horn and salvaged.

An additional object of the invention is to provide a horn construction employing a resonance chamber partially defined by a rigid housing portion having a scroll projector mounted thereon in communication with the chamber whereby the mounting of the projector permits semi-independent vibration of the housing portion and projector and resilient means interposed therebetween dampen undesirable high frequencies.

Figure 2:
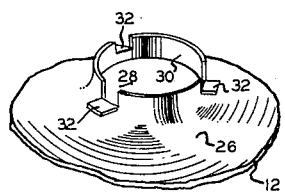
Figure 3:
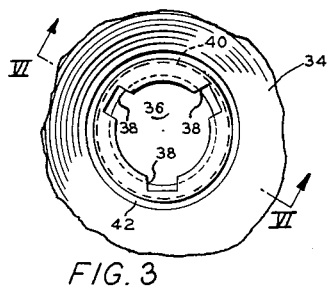
Figure 6:
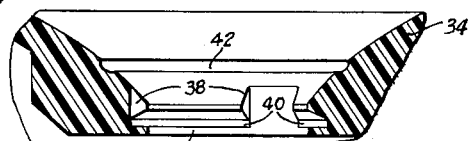
Figure 4:
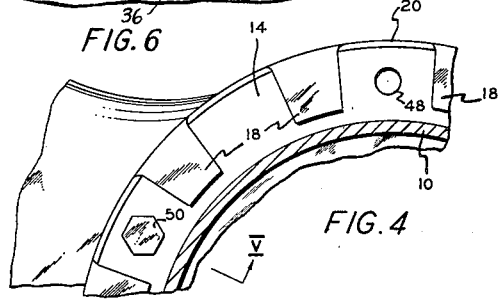
Figure 5:
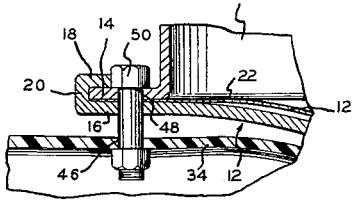

These and other objects of the invention arising from the particular details and relationships of an embodiment thereof will become apparent from the following description and accompanying drawings wherein:

FIG. 1 is an elevational, partly sectioned, view of a plastic projector and motor housing in assembled relation in accord with the invention taken diametrically through the motor housing, FIG. 2 is a fragmentary detailed enlarged perspective view of the horn motor front cover showing the central orifice and bayonet connection formed thereon, FIG. 3 is a detailed plan view of the underside of the horn projector showing the orifice and bayonet connection thereof, FIG. 4 is an enlarged detailed plan view of the assembled front and rear motor covers and projector as taken along IV—IV of FIG. 1, FIG. 5 is a detailed enlarged view of the motor cover peripheral construction taken along the section V—V of FIG. 4 through the locking bolt, and FIG. 6 is an enlarged detail sectional view of the projector opening taken along section VI—VI of FIG. 3.

In the practice of the invention, horn motor structure of a basic conventional configuration is employed wherein the horn motor housing consists of a rigid back cover 10 and a rigid front cover 12 wherein the respective covers are affixed together at their peripheral portions to define an enclosed structure in which the motor coil, armature, diaphragm and operating contacts are enclosed. The back motor cover 10 is formed with a peripheral radially extending flange 14 throughout its circular circumference and the front cover 12 is likewise formed with a radially extending flange portion 16 which, when assembled to the back cover, is parallel thereto. The front cover 12 is provided with a plurality of ears 18 which extend from an axial cylindrical front cover portion 20 and, in the undeformed state, will project in an axial direction at right angles to the front flange portion 16. However, upon assembling the front and back covers in the desired relationship the ears 18, which are formed throughout the complete periphery of the front cover, are deformed radially inward to overlap and intimately engage the back cover flange 14, as shown in FIGS. 1, 4 and 5. As the front cover axially extending portion 20 is continuous throughout the front cover circumference and defines a greater I.D. than the diameter of flange 14 the flange 14 is received within the cylinder defined by the inside surface of the axial portion.

The diaphragm 22 is of circular configuration and is sandwiched between the flange 14 of the rear cover and the flange portion 16 of the front cover wherein the assembly of the front and rear covers by means of the ears 18 will securely maintain the diaphragm in the proper position creating a resonator chamber between the diaphragm and cover 12. The motor armature 24 is centrally affixed to the diaphragm in a conventional manner wherein energizing the motor will cause the armature and diaphragm to vibrate and create the sound vibrations. It will be appreciated that as the assembly of the circular peripheries of the front and back housing covers is uniform throughout the complete circumference of the flange portions of both covers a uniform sealing connection is achieved. This assembly permits the housing to be hermetically sealed and results in a superior sealing connection over conventional designs wherein the construction is such as to make uniform flange circumferential assembly impossible, or very difficult.

As shown in FIG. 1, the front cover 12 is of a general conical configuration having an arcuate surface 26 and developed toward an apex coinciding with the axis of the armature 24. An opening 28 is defined about the axis of the front cover by means of cover axially extending cylinder portion 30, FIG. 2. A plurality of ears or projections 32 are defined upon the cylindrical front cover portion 30 by slitting the portion and deforming the projections radially therefrom. The projections 32 coact with the projector to maintain the assembly of the projector and horn motor housing, as explained hereinafter.

The horn projector 34 is preferably of, though not limited to, the scroll type wherein the acoustical chamber thereof is spirally related to the projector opening 36 into which the sound vibrations are introduced. The projector 34 is preferably constructed of a synthetic plastic material such as polypropylene such as available under the trade name "Profax." This type of material is easily molded, heat resistant and economical and provides pleasing tone and acoustical characteristics as well as being of light weight. Also, such a projector may be molded in the desired color and does not require a separate painting operation.

The projector opening 36, FIG. 3, is of circular configuration having a dimension to receive the front cover cylindrical portion 30 and cutout portions 38 are formed in the projector adjacent the opening 36 to receive the projections 32. The projector is provided with grooves or recesses 40 communicating with the projections 32 wherein the portions 38 and grooves 40 define a bayonet connection in conjunction with the front cover projections 32. The grooves or recesses are of greater width than the thickness of the projections 32 to permit limited movement of the projector toward the cover 12 as explained later. It will, therefore, be appreciated that the horn projector 34 may be assembled to the front cover portion by inserting the cover portion 30 into the projector opening and rotating the motor and projector relative to each other wherein the projections 32, cooperating with the grooves 40, will maintain the assembled relation. Preferably, the grooves 40 are formed in a slightly inclined direction to the axis of the opening 36 wherein rotation of the projector upon the motor will pull the motor housing and the projector toward each other.

The horn projector 34 is also provided with an annular recess 42 formed concentric to the opening 36 to receive a resilient O-ring 44, FIG. 1. The relationship of the inner configuration of the horn projector is similar to that of the outer housing front surface 26 and, hence, as the projector is rotated relative to the motor housing during assembly of these two components, the O-ring 44 will be the only component resisting the movement of the projector toward the front cover 12 and will be compressed and maintain separation between the horn projector and front cover housing.

The projector 34 is provided with a hole 46, FIG. 5, adjacent the projector bell portion and a plurality, usually six, evenly spaced holes 48 are formed in the flange portions of the motor covers whereby a bolt 50 or similar fastener may be inserted through the holes 46 and 48 after assembly of the projector and motor thereby preventing vibration from rotating the projector relative to the motor and accidentally disassembling these components. The bolt 50 does not draw the adjacent portion of the projector into engagement with the flange portion 16 in the preferred assembly but rather, functions only as a rotation prevention locking device.

It will, therefore, be appreciated that the projector may be assembled to the motor in a plurality of positions and that upon mounting the motor housing the projector may be related thereto to provide optimum clearance and sound directional characteristics. Should the motor construction be defective during manufacture, the motor may be discarded separately without scrapping the horn projector.

In that the mass, weight and other vibration affecting factors of a projector are significantly different than those of the rigid front cover 12, the described connection of the projector to the front cover at the central location and the use of the O-ring to dampen the transfer of vibrations from one member to the other will permit a semi-independent projector resonance with respect to the front cover which results in a superior acoustical performance. This semi-independent resonance is due to the fact that the projector is, in a sense, "floating" between the projections 32 and front cover 12 and the O-ring 44 dampens this floating action and biases the projector shoulder defined by grooves 40 into engagement with the projections 32. Also, the O-ring will act as a dampener for high frequencies.

It will be understood that various modifications to the invention may be apparent to those skilled in the art without departing from the spirit and scope thereof and it is intended that the invention be defined only by the following claims.

We claim:
1. In a horn comprising, in combination, a motor having rigid front and back interconnected portions, a diaphragm within said housing defining a resonator chamber with said front portion, a scroll projector of lightweight nonmetallic material, an orifice defined in said front portion, a plurality of radially extending projections mounted on said front portion concentrically spaced about said orifice, bayonet grooves defined on said scroll cooperating with said projections mounting said projector on said front portion in communication with said chamber and a resilient member interposed and compressed between said front portion and said projector.

2. In a horn as in claim 1 wherein said projections are evenly circumferentially spaced with respect to said orifice whereby said scroll may be selectively angularly mounted on said front housing portion, and locking means interconnect said scroll and front portion maintaining said angular relation.

3. In a horn, a motor housing comprising front and back housing portions, a diaphragm within said housing, a peripheral diaphragm mounting portion defined on each of said housing portions between which said diaphragm is peripherally interposed and supported upon interconnection of said housing portions, said diaphragm and front housing portion defining a resonator chamber, a scroll projector removably mounted on said front housing portion in communication with said chamber and fastening means evenly spaced about the periphery of one of said housing portions adjacent the diaphragm mounting portion thereof cooperating with the entire peripheral region of the other housing portion maintaining said housing portions in assembled relation, said fastening means comprising a plurality of ears defined on the periphery of said one of said housing portions which are deformed upon the other housing portion so that the diaphragm mounting portion of said other housing portion is interposed between said deformed ears and the diaphragm mounting portion of said one housing portion.

4. A horn having a driving motor housing having an aperture defined thereon, a scroll projector nonrigidly connected to said housing having an opening defined therein in register with said housing aperture, and resilient means between said housing and said scroll projector resisting movement of said scroll projector with respect to said housing.

5. In a horn as in claim 4, wherein said scroll projector is formed of a lightweight, nonmetallic, material.

6. A horn having a driving motor housing having an aperture defined therein, scroll projector mounting means formed on said housing, a scroll projector releasably mounted on said scroll projector mounting means having an aperture defined therein in communication with said housing aperture, said mounting means permitting independent vibration of said housing and projector, and resilient means interposed between said housing and said scroll projector resisting and dampening movement of said scroll projector relative to said housing.

7. In a horn as in claim 6, wherein said scroll projector mounting means comprises a bayonet connection having projections defined on said housing disposed adjacent said housing aperture and radially disposed thereto, and a groove and slot connection defined on said scroll projector concentrically related to said projector aperture adapted to receive said projections.

8. In a horn as in claim 6 wherein said resilient means comprises a resilient ring interposed between said housing and scroll projector and concentrically related to said housing and scroll projector apertures.

References Cited in the file of this patent

UNITED STATES PATENTS

| | | |
|---|---|---|
| 1,091,533 | Pierman | Mar. 31, 1914 |
| 2,958,307 | Best et al. | Nov. 1, 1960 |